United States Patent [19]
Kempf et al.

[11] 3,722,643
[45] Mar. 27, 1973

[54] VEHICLE CLUTCH WITH GEAR SYNCHRONIZING BRAKE

[75] Inventors: Reiner Kempf, 8702 Hettstadt; Hans-Walter Riese, 8721 Dittelbrunn, both of Germany

[73] Assignee: Fichtel & Sachs AG, Schweinfurt am Main, Germany

[22] Filed: Sept. 30, 1971

[21] Appl. No.: 185,069

[30] Foreign Application Priority Data

Oct. 9, 1970 Germany...................P 20 49 557.2

[52] U.S. Cl..............................192/13 R, 192/113 B
[51] Int. Cl.............................................F16d 67/02
[58] Field of Search................192/13 R, 18 R, 113 B

[56] References Cited

UNITED STATES PATENTS

| | | | |
|---|---|---|---|
| 3,179,217 | 4/1965 | Root | 192/13 R |
| 1,684,471 | 9/1928 | Carhart | 192/13 R |
| 2,511,133 | 6/1950 | Spase | 192/18 R |
| 2,861,482 | 11/1958 | Schjolin | 192/13 R |
| 1,991,625 | 2/1935 | Peterson | 192/13 R |
| 2,930,460 | 3/1960 | Isaacson | 192/18 R |
| 3,203,520 | 8/1965 | Root | 192/13 R |
| 3,540,557 | 4/1969 | Hasselbacher | 192/113 B X |

*Primary Examiner*—Benjamin W. Wyche
*Attorney*—Hans Berman et al.

[57] ABSTRACT

The clutch release mechanism of a friction clutch for a truck or like heavy-duty automotive vehicle is linked with a brake which quickly slows the clutch shaft when the clutch is released to permit prompt shifting of the associated gear transmission. Continued rapid rotation of the shaft after axial disengagement of the driven disc from the pressure plate may otherwise result from the inertia of the relatively heavy driven disc or from the viscosity of the cooling oil often employed in such heavy-duty clutches, particularly while the oil is still cold.

11 Claims, 4 Drawing Figures

VEHICLE CLUTCH WITH GEAR SYNCHRONIZING BRAKE

This invention relates to automotive friction clutches, and particularly to an improvement in a heavy clutch for a truck or the like in which a driven clutch disc is secured on the output shaft of the clutch against rotation, and is normally clamped by one or more clutch springs between a driving disc, such as the flywheel of the associated engine, and an axially movable pressure plate, a clutch release mechanism being provided to relieve the pressure plate of spring pressure and thereby to disengage the clutch.

When such a clutch is arranged in the drive train of a vehicle ahead of a multiple-speed transmission and needs to be disengaged before shifting the transmission, it is usually essential that no further driving torque be transmitted by the clutch shaft to the transmission during the shifting step. It has been found that the inertia of the driven disc or discs in a heavy-duty clutch provides sufficient torque after clutch disengagement to interfere with prompt gear shifting, and that a significant amount of torque is transmitted by cold oil in oil-cooled clutches after direct contact between the driven disc or discs and the driving elements has been interrupted. It is notoriously hard to shift the transmission of a truck equipped with a conventional, oil-cooled clutch in cold weather before the oil reaches its normal operating temperature.

It is a primary object of this invention to facilitate gear shifting in trucks and like vehicles by preventing torque to be transmitted to the gear transmission by its input shaft after the clutch pedal has been depressed.

The improved clutch arrangement of this invention is characterized by the provision of a brake for braking the output shaft and including brake elements respectively fastened to the fixed support structure of the vehicle on which the clutch shaft rotates about its axis, and to the output shaft. A brake engaging mechanism responds to the operating movement of a clutch release member for frictionally engaging the brake elements and thereby impeding rotation of the output shaft when the clutch pedal is depressed.

Other features, additional objects, and many of the attendant advantages of this invention will readily be appreciated as the same becomes better understood by reference to the following detailed description of a preferred embodiment when considered in connection with the appended drawing in which:

FIG. 1 shows only as much of the otherwise conventional power train of a heavy truck as is necessary for an understanding of this invention, the known elements of the clutch arrangement, with which this invention is more particularly concerned, being partly omitted and partly broken away for the sake of greater clarity.

Figure 1:
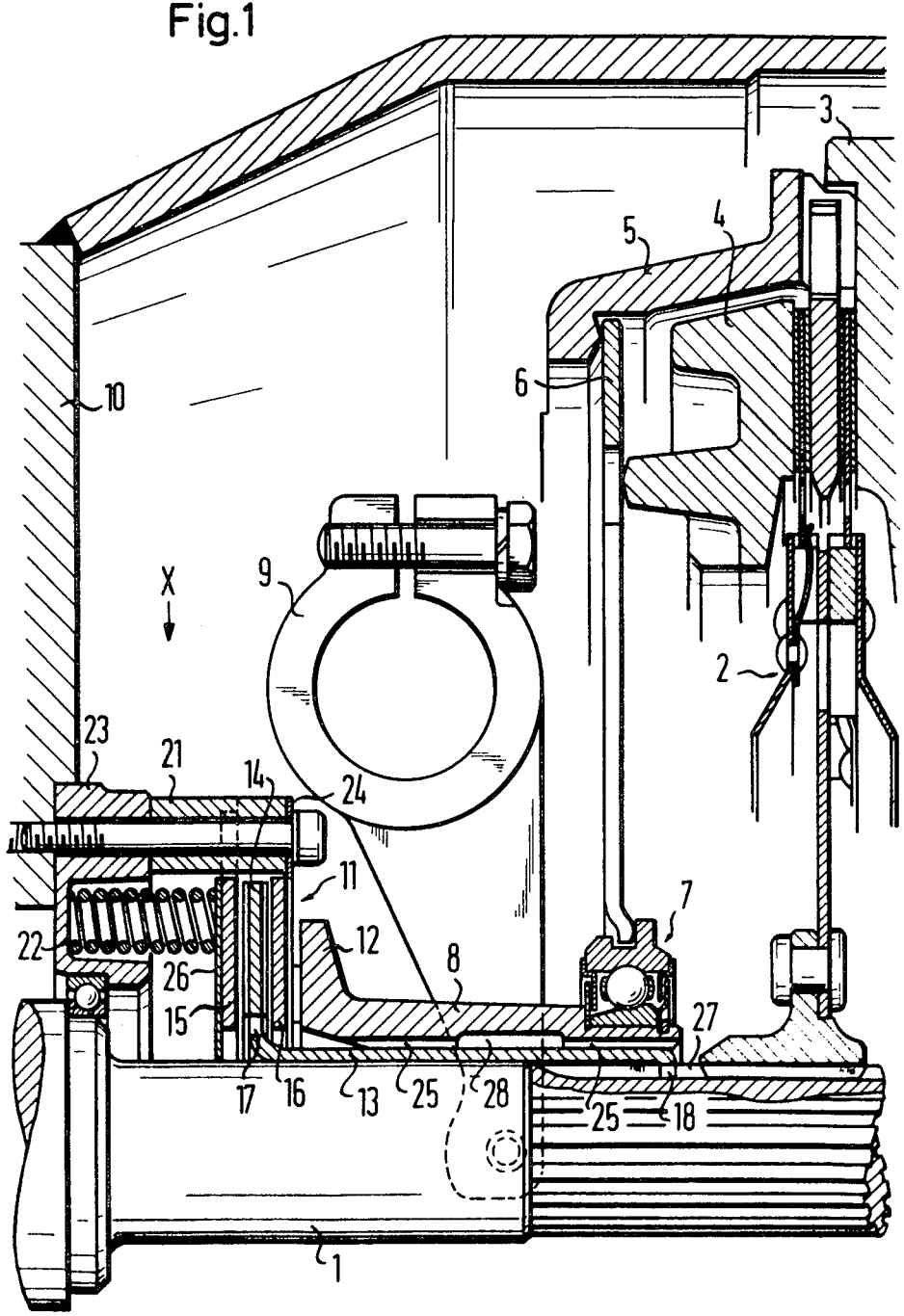
FIG. 1 shows a clutch arrangement of the invention in fragmentary elevational section through the clutch axis.

The output shaft 1 of the clutch, hereinafter referred to as the clutch shaft, simultaneously constitutes the input shaft of a multiple-speed gear transmission, not otherwise shown. A driven dual clutch disc 2 is splined to the shaft 1 by interengaged axial ribs and grooves 27 in the hub of the disc 2 and the outer circumference of the shaft 1 so that the disc 2 is secured against rotation relative to the shaft, but is free to move axially. The disc 2 transmits torque from the flywheel 3 of an internal combustion engine, not otherwise shown, to the shaft 1 when pressed against the flywheel 3, which is the driving member of the clutch arrangement, by an annular pressure plate 4.

As is conventional and not shown in detail, a clutch casing 5 is fixedly attached to the flywheel 3, and the pressure plate is secured against rotation relative to the casing, but axially movable relative to the casing. A diaphragm spring 6 engages the casing 5 and the pressure plate 4 and normally biases the pressure plate 4 axially toward the flywheel 3 so as to clamp the driven disc 2 between respective, axially opposite, radial faces of the jointly rotating flywheel and pressure plate for transmission of torque from the engine to the clutch shaft 1.

The radially inner, first part of a clutch release bearing 7 is mounted on the front end of a tubular clutch release member 8, and the radially outer bearing part, which envelops the inner part, transmits axial motion of the member 8 to the diaphragm spring 6 in such a manner as to permit movement of the pressure plate 4 axially away from the driven disc 2 and the flywheel 3 when the clutch release member is moved rearwardly, that is, toward the left as viewed in FIG. 1, by a clutch fork 9 connected to the non-illustrated clutch pedal of the truck, rotation of the member 8 being prevented by the fork 9.

The clutch described so far is conventional, and its mode of operation is commonly known so as not to require more detailed description. The clutch shaft 1 and the flywheel 3 are mounted for rotation about a common axis in a support structure which includes the transmission housing 10 and is fixed to the frame of the vehicle.

According to this invention, a brake 11 is provided for impeding rotation of the output shaft when the fork 9 moves the clutch release member 8 in an axial, rearward direction. The axially terminal rear portion of the tubular member 8 carries an integral radial flange 12 which serves as a brake engaging member. A bearing bushing 13 is radially interposed between the tubular member 8 and the shaft 1. Its rear end is integral with a radial flange 14 interposed axially between two annular brake elements 15, 16 which are secured against rotation about the clutch axis, as will presently become apparent, but can move axially toward and away from the interposed flange 14. In axial sequence from front to back, the elements 16, 14, 15 thus constitute a first, a second, and a third brake element, the second element 14 being provided with friction facings 32 on its radial contact faces, as is conventional in itself and better seen in FIG. 4. Axial apertures 17 are provided in the second brake element 14 closely adjacent the tubular portion of the bushing 13.

Integral lugs 18 extend radially from the front end of the bushing into the grooves 27 which guide the driven clutch disc 2, and permit axial movement of the bushing 13 and of the second brake element 14 while coupling the bushing and the second brake element 14 to the shaft 1 for joint rotation.

Figure 3:
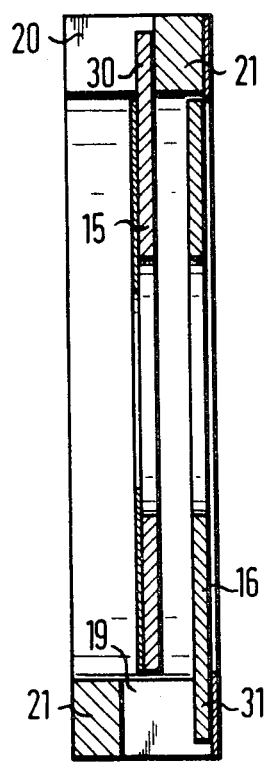
FIG. 3 is a plan section of a brake housing and of two brake elements of the arrangement of FIG. 1.
Figure 4:
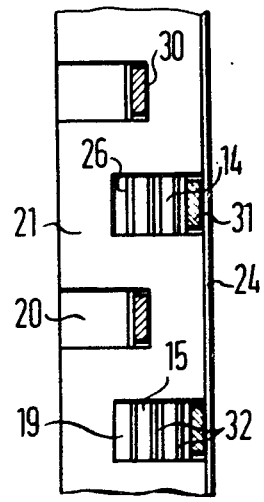
FIG. 4 is a fragmentary developed view of the brake housing and of associated elements as viewed in the direction of the arrow X in FIG. 1.

In a similar manner, best seen in FIGS. 3 and 4 when considered with FIG. 1, the first and third brake elements 16, 15 are axially movable, but circumferentially secured in guide slots 19, 20 of a brake housing 21 which envelops the stack of brake elements and is bolted to the transmission housing 10, the bolts passing through a ring 23 which provides seats for circumferentially distributed helical compression springs 22, only one spring being shown in the drawing.

The stack of brake elements is confined in a space circumferentially bounded by the brake housing 21 and axially bounded by two annular sheet-metal discs. The disc 26 is axially interposed between the springs 22 and the third brake element 15, thereby transmitting the force of the springs to the stack of brake discs. The central opening of the disc 26 is not significantly greater than the cross section of the clutch shaft so that the space enclosing the brake elements is substantially sealed in a rearward direction.

The disc 24 is fixedly attached to the brake housing 21 so as to provide an abutment which limits forward movement of the brake elements, but its central opening is sufficiently great freely to pass the brake engaging flange 12 on the tubular clutch release member 8. Jointly with the brake element 16, the disc 24 seals the brake space forwardly in the illustrated position of the clutch.

Figure 2:
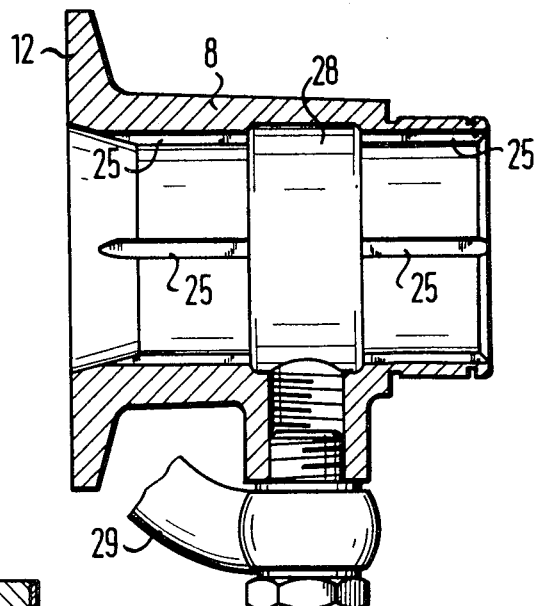
FIG. 2 shows a clutch release member of the arrangement of FIG. 1 in a corresponding section.

As is evident from joint consideration of FIGS. 1 and 2, axial grooves 25 are circumferentially distributed about the inner face of the tubular member 8. They are open axially both forward and rearward and intersect a wider and deeper circumferential groove 28 in the inner face of the member 8. The annular groove 28 communicates through a nipple on the member 8 with a flexible hose 29 which is the only illustrated element of a cooling oil supply system, known in itself. When the member 8 is mounted on the bushing 13, the grooves 25, 28 are closed in a radial inward direction to form conduits for cooling oil whose source, as far as shown, is the hose 29. The oil is distributed about the inner circumference of the member 8 by the groove 28 and discharged from the grooves 25 axially forward and rearward toward the friction faces of the driven discs 2, as is well known, but also into the space between the discs 24, 26. The oil passes partly through the apertures 17 in the second brake element 14 to reach the face of the latter remote from the flange 12, and its premature release is prevented by the axial covers or closures provided by the disc 26 in all operative positions of the brake, and by the abutment disc 24 when the clutch is engaged and the brake 11 is inoperative.

As is shown in FIGS. 3 and 4, the guide slots or recesses 19 are open in a forward direction, that is, toward the flywheel 3, but are closed rearwardly by a transverse wall. The guide slots 20 are open toward the transmission housing 10 and bounded by a transverse end wall in a forward direction. Radial projections 30 extend from the third brake element 15 into the slots or recesses 20, and similar projections 31 on the first brake element 16 are received in the slots 19. In the illustrated condition of the clutch arrangement, the projections 30 are pressed against the transverse end walls of the slots 20 by the springs 22, but deformation of the projections under the spring pressure is prevented by the abutment disc 24 which engages the first brake element 16 over the entire circumference of the same, including the projections 31, the axial spacing of the end walls in the slots 20 from the abutment disc 24 corresponding to the combined thickness of the brake elements 15, 14 and of the associated friction facings 32. The axial length of the slots 19 is greater than the thickness of the entire stack of brake elements by the maximum operating stroke of the clutch releasing member 8.

When the non-illustrated clutch pedal is depressed against the restraint of the diaphragm spring 6, the clutch release bearing 7 moves rearward, thereby pivoting the radially slotted spring 6 on the clutch casing 5 and relieving the pressure plate 4 of the spring pressure, thereby disengaging the clutch in the usual manner. Simultaneously, the brake engaging flange 12 is pressed against the brake element 16 and moves the same against the second brake element, and both against the third element which yields and compresses the springs 22. The rotation of the second element 14 is impeded by frictional engagement with the elements 15, 16, and braking torque is transmitted by the bushing 13 and its lugs 18 to the shaft 1 which is quickly decelerated as the spring 6 is lifted from the pressure plate 4, and the disc 2, jointly rotating with the shaft 1, is released by the pressure plate 4 and the flywheel 3. No further torque is transmitted by the disc 2 and the shaft 1 to the non-illustrated gear transmission which may thus be shifted immediately after the clutch pedal was depressed regardless of the inertia of the heavy disc 2 and of the viscosity of the cooling oil. The brake reaction is transmitted to the transmission housing 10 and to other fixed support structure by the brake housing 21 and the ring 23.

As is evident from the preceding description of a preferred embodiment and from the drawing, the clutch brake of the invention consists of few parts which would not normally be used in a conventional clutch of the heavy-duty type. Thus, the brake engaging flange 12 and the second brake element 14 are unitary portions of the usual tubular clutch releasing member 8 and of the bushing 13 commonly provided for reducing wear of the shaft 1 and of the member 8. However, in this arrangement, the bushing is axially movable on the shaft 1, and the grooves 27, conventionally provided for securing the driven disc 2 against rotation on the shaft 1, do double duty in similarly securing the bushing 13.

The system of oil conduits usually providing cooling fluid for the clutch disc 2 also provides cooling fluid to the brake elements 16, 14, 15, and the fluid inherently forms a continuously renewed lubricant film at the interface of the stationary member 8 and the rotating bushing 13. Wear of the lubricated friction facings 32 on the brake elements is slow and does not readily affect the operation of the brake because of the compensating effect of the springs 22. The springs also make the brake operation independent from wear of the friction facings on the discs 2 and from the resulting increase in the stroke of the clutch release member 8.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the appended claims.

What is claimed is:

1. A clutch arrangement comprising:
   a. a support;
   b. an output shaft mounted on said support for rotation about an axis;
   c. a driving member rotatable on said support about said axis;
   d. a clutch casing fixedly fastened to said driving member;
   e. a pressure plate secured to said clutch casing for joint rotation, said pressure plate and said driving member having respective, opposite, radially extending faces;
   f. yieldably resilient means on said casing biasing said pressure plate axially toward said driving member;
   g. a driven disc member secured to said output shaft for joint rotation and axially movable thereon between said opposite faces, said yieldably resilient means normally clamping said driven disc member between said faces for transmission of torque from said driving member to said output shaft;
   h. clutch release means including
      1. a tubular clutch release member coaxially enveloping said shaft and being secured against rotation with said shaft, said clutch release member having two axially terminal portions respectively adjacent and remote from said driving member,
      2. actuating means for moving said clutch release member on said shaft in an axial direction, and
      3. motion transmitting means for moving said pressure plate away from said driving member when said clutch release member is moved axially away from said driving member, said motion transmitting means including
         i. a clutch release bearing having a first part mounted on the terminal portion of said tubular clutch release member adjacent said driving member, and a second part rotatable on said first part about said axis, and
         ii. a motion transmitting member secured to said pressure plate for rotation therewith and engaging said second part for transmitting axial motion from said second part to said pressure plate;
   j. brake means for braking said output shaft, said brake means including a first brake element secured to said support against rotation about said axis and a second brake element secured to said output shaft for rotation therewith; and
   k. brake engaging means responsive to axial movement of said clutch release member away from said driving member for frictionally engaging said brake elements and thereby impeding said rotation of said output shaft,
      1. said brake engaging means including a brake engaging member fixedly mounted on the axially terminal portion of said tubular clutch release member remote from said driving member, and axially moving said braking elements relative to each other into a position of engagement when said clutch release member moves axially away from said driving member.

2. An arrangement as set forth in claim 1, said support including a transmission housing, said output shaft constituting the input shaft of a multiple-speed transmission in said housing, a first one of said brake elements being secured on said housing, said brake means including a third brake element secured on said housing against rotation about said axis, said first brake element and said third brake element being arranged for axial movement toward and away from each other, the second brake element being axially movable on said shaft between said first and third brake elements.

3. An arrangement as set forth in claim 2, said clutch release member being tubular about said axis, a bushing coaxially interposed between said tubular member and said output shaft, a first axially terminal portion of said bushing adjacent said driven disc being secured on said shaft against rotation, and said second brake element being fixedly fastened to the second axially terminal portion of said bushing.

4. An arrangement as set forth in claim 3, a portion of said shaft being formed with axially elongated, circumferentially alternating ribs and grooves, said driven disc movably engaging said grooves, and said first axially terminal portion of the bushing carrying a plurality of radial lugs received in said grooves respectively for securing the bushing against rotation on said shaft while permitting axial movement thereof.

5. An arrangement as set forth in claim 3, further comprising a source of cooling oil, said clutch release member having an inner axial face formed with a groove therein, said groove being axially open toward said driven disc and said brake elements and communicating with said source.

6. An arrangement as set forth in claim 5, said second brake element being axially interposed between the portion of said groove axially open toward said brake elements and said third brake element and being formed with an axial aperture for passage of oil from said portion of the groove toward said third brake element.

7. An arrangement as set forth in claim 6, further comprising cover means axially bounding said brake housing for impeding release of said cooling oil from said brake housing.

8. An arrangement as set forth in claim 2, further comprising a brake housing mounted on said transmission housing and enveloping said brake elements, said brake housing having a circumferential wall formed with a first axially elongated recess open toward said driving member and with a second axially elongated recess open in a direction away from said driving member, said first brake element having a radial projection axially guided in said first recess, and said third brake element having a radial projection axially guided in said second recess, said recesses having respective transverse end walls.

9. An arrangement as set forth in claim 8, further comprising yieldably resilient means biasing said third brake element toward engagement with said end wall of said second recess, said brake engaging means including a brake engaging member on said clutch release member, said first brake element being axially interposed between said brake engaging member and said second brake element.

10. An arrangement as set forth in claim 9, further comprising abutment means axially bounding said brake housing in a direction toward said driving member and limiting movement of said first brake element in the last-mentioned direction.

11. An arrangement as set forth in claim 1, said second part being offset from said first part in a radially outward direction and enveloping said first part, said actuating means comprising a yoke member mounted on said support for axially moving said clutch release member while securing the same against rotation about said axis.

* * * * *